United States Patent
Matzen

(10) Patent No.: US 8,857,268 B2
(45) Date of Patent: Oct. 14, 2014

(54) METHOD AND ELECTROMAGNETIC FLOWMETER HAVING CORROSION PROTECTED MEASURING ELECTRODES

(75) Inventor: Steen Moellebjerg Matzen, Sydals (DK)

(73) Assignee: Siemens Aktiengesellschaft, Munich (DE)

( * ) Notice: Subject to any disclaimer, the term of this patent is extended or adjusted under 35 U.S.C. 154(b) by 590 days.

(21) Appl. No.: 13/148,004

(22) PCT Filed: Feb. 4, 2009

(86) PCT No.: PCT/EP2009/000746
§ 371 (c)(1),
(2), (4) Date: Oct. 25, 2011

(87) PCT Pub. No.: WO2010/088921
PCT Pub. Date: Aug. 12, 2010

(65) Prior Publication Data
US 2012/0031197 A1     Feb. 9, 2012

(51) Int. Cl.
*G01F 1/58*  (2006.01)
*C23F 13/02* (2006.01)
*G01F 15/00* (2006.01)
*G01F 1/60*  (2006.01)

(52) U.S. Cl.
CPC .............. *C23F 13/02* (2013.01); *G01F 1/584* (2013.01); *G01F 15/006* (2013.01); *G01F 1/60* (2013.01)
USPC ...................................... 73/861.12

(58) Field of Classification Search
None
See application file for complete search history.

(56) References Cited

U.S. PATENT DOCUMENTS

| | | | |
|---|---|---|---|
| 3,530,713 A * | 9/1970 | Nazareth, Jr. ............... 73/861.12 |
| 3,999,443 A | 12/1976 | Appel et al. |
| 4,524,627 A | 6/1985 | Yamasaki et al. |
| 5,503,026 A | 4/1996 | Böhm et al. |
| 6,237,424 B1 * | 5/2001 | Salmasi et al. ............ 73/861.17 |
| 6,920,799 B1 | 7/2005 | Schulz |
| 7,934,431 B2 | 5/2011 | Kerrom et al. |
| 8,408,070 B2 * | 4/2013 | Matzen ..................... 73/861.12 |
| 2007/0022823 A1 | 2/2007 | Knill et al. |
| 2008/0110280 A1 | 5/2008 | Bier |

FOREIGN PATENT DOCUMENTS

| | | |
|---|---|---|
| CN | 1299962 | 6/2001 |
| EP | 0 770 857 | 5/1997 |
| WO | WO 2007/104707 | 9/2007 |

* cited by examiner

Primary Examiner — Harshad R Patel
(74) Attorney, Agent, or Firm — Cozen O'Connor

(57) ABSTRACT

A system and method for corrosion protection of measuring electrodes in electromagnetic flowmeters, wherein a respective constant direct current is generated by a current source for first and second metallic measuring electrodes provided on opposite sides of a measuring tube, and the constant direct current is passed from the current source to the first and second metallic measuring electrodes, where the constant direct current passed to each metallic measuring electrode is established to lower the electrode potential of a respective measuring electrode with respect to the medium below a threshold value to render the respective metallic measuring electrode immune to corrosion with respect to a medium.

7 Claims, 2 Drawing Sheets

METHOD AND ELECTROMAGNETIC FLOWMETER HAVING CORROSION PROTECTED MEASURING ELECTRODES

CROSS-REFERENCE TO RELATED APPLICATIONS

The present application is a U.S. national stage of application No. PCT/EP2009/000746 filed 4 Feb. 2009.

BACKGROUND OF THE INVENTION

1. Field of the Invention

The present invention relates to electromagnetic flowmeters and, more particularly, to cathodic protection of measuring electrodes in electromagnetic flowmeters.

2. Description of the Related Art Electromagnetic flowmeters, such as magnetic inductive flowmeters, utilize the principle of electrodynamic induction for flow rate measurement of a fluid medium. In an electromagnetic flowmeter, a magnetic field is generated across a measuring section of a flowmeter pipe through which the medium flows which, by operation of Faraday's law, generates a voltage perpendicular to the flow of the medium and the magnetic field, The induced voltage is measured by a pair of electrodes positioned on opposite sides of the measuring section. This induced voltage that is measured by these electrodes is proportional to the flow velocity of the medium to be measured, averaged over the cross section of the flow meter pipe.

In general, the measuring electrodes used in electromagnetic flowmeters may be made from a range of different materials depending on the intended application of the flowmeter. The suitability of the material of the measuring electrodes for a given media is often not a trivial task, because corrosion effects have to be taken into account. Sometimes a very exotic (i.e., expensive) material such as platinum has to be used to withstand the corrosion effects of a specific media. Furthermore, in cases of corrosion the noise level on the flow measurement is increased.

SUMMARY OF THE INVENTION

It is therefore an object of the present invention to provide an improved electromagnetic flowmeter having corrosion protection of the measuring electrodes.

This and other objects and advantages are achieved by an electromagnetic flowmeter comprising first and second metallic measuring electrodes arranged on opposite sides of the measuring tube and in contact with the medium, a rate of flow of the medium in the measuring tube being measurable by measuring output signals from the first and second measuring electrodes representing a potential difference between the measuring electrodes induced by the flow of the medium in the measuring tube in a presence of a magnetic field, and a current source for passing a constant direct current to each of the first and second metallic measuring electrodes, where the constant direct current passed to each of the first and second metallic measuring electrode is established to lower an electrode potential of a respective measuring electrode with respect to the medium to a level below a threshold value to render the respective metallic measuring electrode immune to corrosion with respect to the medium.

The object of the invention is also achieved by a method for corrosion protection of an electromagnetic flowmeter for measuring flow of a medium through a measuring tube method comprising generating a constant direct current at a current source; and passing the constant direct current to first and second metallic measuring electrodes provided on opposite sides of the measuring tube and in contact with the medium, where the constant direct current passed to each metallic measuring electrode is established to lower an electrode potential of a respective measuring electrode with respect to the medium below a threshold value to render the respective metallic measuring electrode immune to corrosion with respect to the medium In accordance with the invention, corrosion protect of measuring electrodes of an electromagnetic flowmeter from corrosion is provided that obviates the task of selecting suitable materials for measuring electrodes for different kind of media. Moreover, a constant direct current is used to lower the electrode potential of the measuring electrodes to a level to render the measuring electrodes immune to corrosion with respect to the medium. Thus it is possible to use cheaper material for the measuring electrodes.

In one embodiment, the threshold value is determined based upon a Pourbaix diagram of the material of a particular metallic measuring electrode, such that when the electrode potential of the particular metallic measuring electrode is lowered below the threshold value, the particular metallic measuring electrode achieves a state of immunity to corrosion independent of the pH of the medium. This set up can be advantageously used for many applications irrespective of the nature of the medium, without the user having to adjust the electrode potential of the measuring electrodes for each instance.

In a preferred embodiment, the flowmeter further comprises a flow measurement device that is configured to measure the flow of the medium based upon output signals from the measuring electrodes, where the current source has an output impedance that does not significantly lower the input impedance of the flow measurement device. The advantage of this embodiment is that the measurement system does not impinge on the electrode voltage signal which can have relative high output impedance. The output impedance depends on the media conductivity and the electrode diameter.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is further described hereinafter with reference to illustrated embodiments shown in the accompanying drawings, in which.

DETAILED DESCRIPTION OF THE PREFERRED EMBODIMENTS

Figure 1:
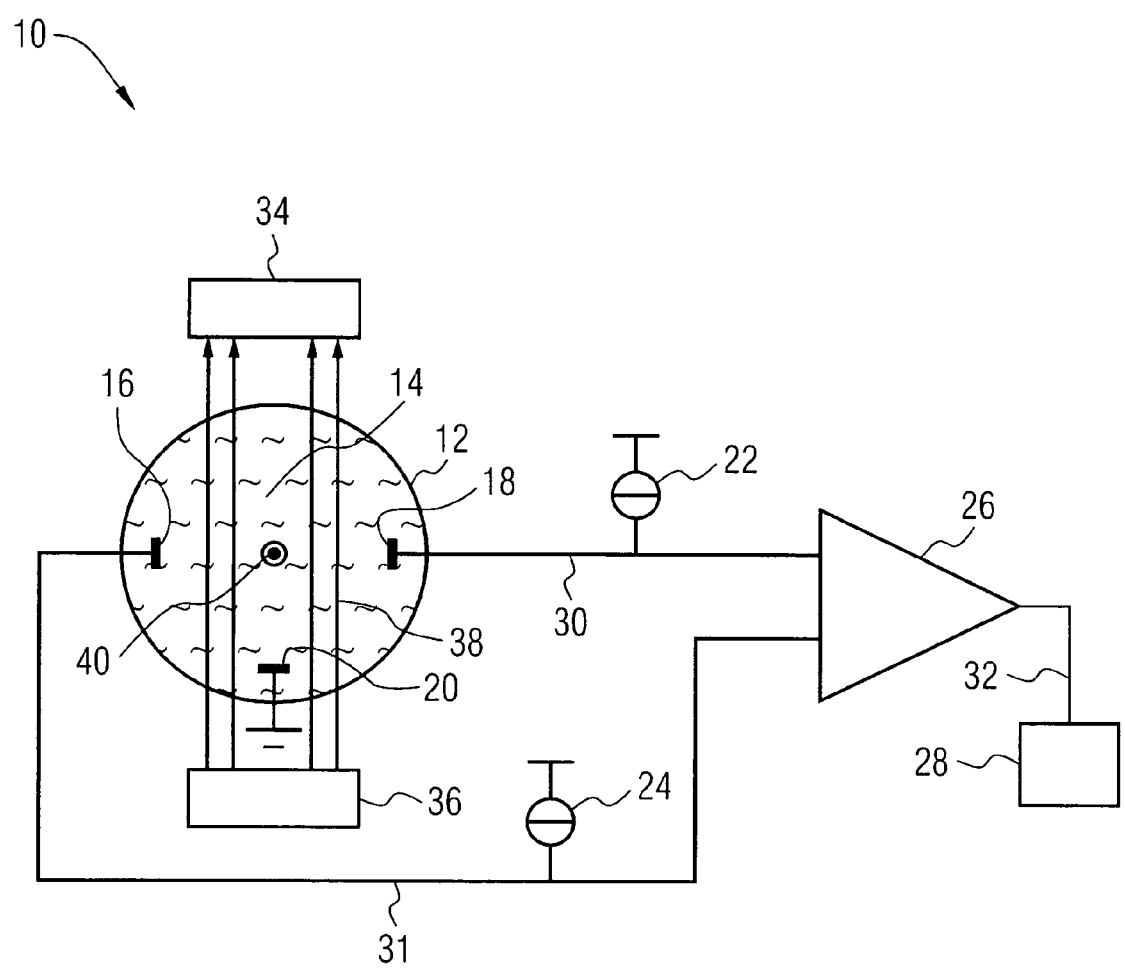
FIG. 1 is an schematic block diagram of an electromagnetic flowmeter in accordance with an embodiment of the invention.

An electromagnetic flowmeter apparatus 10 in accordance with an embodiment of the present invention is illustrated in FIG. 1. A fluid medium 14, whose flow rate is to be measured, flows through a measuring tube 12, along the direction of the axis 40 of the measuring tube 12. The medium 14 to be measured is electrically conductive, at least to a slight extent.

The flowmeter 10 includes a pair of measuring electrodes 16, 18 arranged on opposite sides of the measuring tube 12 and in contact with the medium 14. A third electrode 20 is usually provided at the bottom of the measuring tube 12 and is grounded. A magnetic arrangement is provided including electromagnets 34, 36 that generate a magnetic field 38, oriented perpendicularly to the flow direction of the medium 14. Due to this magnetic field 38, charge carriers in the medium 14 migrate to the measuring electrodes 16 and 18 of opposite polarity. The potential difference which builds up across the electrodes 16 and 18 is proportional to the flow velocity of the medium 14, averaged over the cross-sectional area of the measuring tube 12. A flow measurement device, such as a differential amplifier 26, amplifies this potential difference (i.e., the difference in the output signals 30, 31 from the measuring electrodes 16, 18, respectively), and provides the amplified output 32 to flow detection circuitry 28. The flow detection circuitry 28 calibrates the output 32 of the differential amplifier 26 to units of flow velocity or flow rate, and provides an output to output circuitry (not shown).

Figure 2:
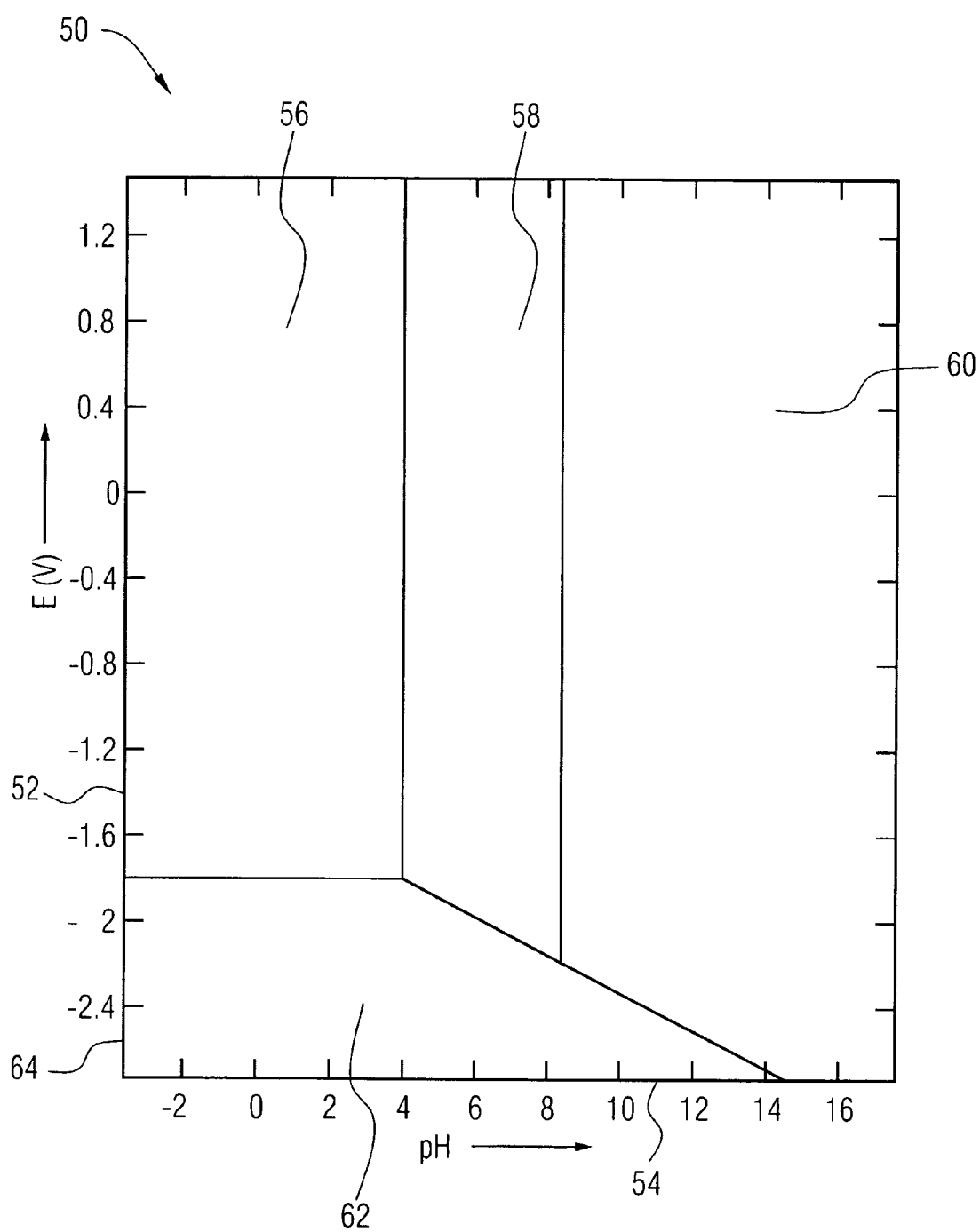
FIG. 2 is an exemplary Pourbaix diagram illustrating corrosion effects on the material of a measuring electrode with varying pH of the medium.

The measuring electrodes 16, 18 are made from electrically conductive metallic material. Consequently, the measuring electrodes 16, 18 are prone to corrosion effects from the medium 14. In order to determine the tendency of the metallic material of the measuring electrodes to corrode, a Pourbaix diagram may be used. An exemplary Pourbaix diagram 50 is illustrated in FIG. 2. The illustrated Pourbaix diagram 50 is a plot of electrode potential E of a measuring electrode (In volts V), represented along the axis 52, and pH of the medium, represented along the axis 54. As known to one skilled in the art, a Pourbaix diagram maps out possible stable (i.e., equilibrium) phases of an electrochemical system. Predominant on boundaries are represented by lines. Referring to FIG. 2, such stable phases are denoted by the regions 56, 58, 60, 62 in the Pourbaix diagram 50. Regions 56, 60 indicate states of corrosion, region 58 indicates a state of passivation, while the region 62 indicates a state of immunity. Based upon the above described Pourbaix diagram 50, cathodic protection of the measuring electrodes 16 and 18 may be achieved by lowering the electrode potential of each of the measuring electrodes 16, 18 to within the region 62, such that the material of the electrodes become immune to corrosion.

Referring back to FIG. 1, in accordance with the present exemplary embodiment, the flowmeter 10 is provided with one or more current sources 22, 24 for passing a constant direct current to each of the measuring electrodes 16, 18 that will lower the electrode potential of these electrodes with respect to the medium 14 below a threshold value beyond at which these electrodes achieve a state of immunity with respect to the medium 14. The advantage of incorporating a direct current source at the measuring electrodes is that it does not interfere with the flow signal from the measuring electrodes. This is because flow detection circuitry 28 usually comprises a high pass filter that rejects the DC voltage (caused by the current source and the inherent DC voltage at the electrodes).

Further, as seen from FIG. 2, if the electrode potential of a measuring electrode is lowered beyond a specific threshold value 62, such as the threshold level indicated by reference designator 64, the measuring electrode would achieve a state of immunity regardless of the pH of the medium. This set up can be thus advantageously used for many applications irrespective of the nature of the medium, without the user having to adjust the electrode potential of the measuring electrodes for each instance. Referring again to FIG. 1, the differential amplifier 26 has high input impedance, for example, of the order of $10^{12}$ ohms. The electrode impedance of a measuring electrode 16, 18 is a function of the conductivity of the medium 14 and the mechanical properties of the measuring electrode 16, 18, such as the diameter. For example, for an electrode diameter of 1 mm and media conductivity of 5 $\mu$S/cm, the resulting electrode impedance is of $10^6$ ohms. The flow signal (i.e., output signals 30, 31) from the measuring electrodes 16, 18 is thus a voltage source having a relative high output impedance.

Accordingly, in a preferred embodiment, the current sources 22, 24 have a high output Impedance that does not impinge on the flow signal 32 by lowering the input impedance of the flow measurement device 26.

The advantage of the present invention is that it makes it possible to use electrodes of relative poor corrosion properties in connection with very aggressive media. The main advantage of this is the lowering the sensor cost and minimization of the stock of different sensors with different electrode material.

The disclosed embodiments of the invention provide a system and method for protecting measuring electrodes 16, 18 in electromagnetic flowmeters from corrosion. In accordance with the disclosed embodiments of the invention, an electromagnetic flowmeter 10 for measuring the flow of a medium 14 through a measuring tube 12 comprises first and second metallic measuring electrodes 16, 18 arranged on opposite sides of the measuring tube 12 and in contact with the medium 14. The rate of flow of the medium 14 in the measuring tube 12 is measurable by measuring output signals 30, 31 from the measuring electrodes 16, 18 representing a potential difference between the measuring electrodes 16, 18 induced by the flow of the medium 14 in the measuring tube 12 while in the presence of a magnetic field 38. The proposed flowmeter 10 further comprises a current source 22, 24 for passing a constant direct current to each of the metallic measuring electrodes 16, 18. The constant direct current passed to each metallic measuring electrode 16, 18 is established to lower the electrode potential of a respective measuring electrode 16, 18 with respect to the medium 14 below a threshold value to render the respective metallic measuring electrode immune to corrosion with respect to the medium 14.

Although the invention has been described with reference to specific embodiments, this description is not meant to be construed in a limiting sense. Various modifications of the disclosed embodiments, as well as alternate embodiments of the invention, will become apparent to persons skilled in the art upon reference to the description of the invention. It is therefore contemplated that such modifications can be made without departing from the spirit or scope of the present invention.

Thus, while there are shown, described and pointed out fundamental novel features of the invention as applied to preferred embodiments thereof, it will be understood that various omissions and substitutions and changes in the form and details of the illustrated apparatus, and in its operation, may be made by those skilled in the art without departing from the spirit of the invention. Moreover, it should be recognized that structures shown and/or described in connection with any disclosed form or embodiment of the invention may be incorporated in any other disclosed or described or suggested form or embodiment as a general matter of design choice.

The invention claimed is:

1. An electromagnetic flowmeter for measuring the flow of a medium through a measuring tube to provide corrosion protection of the electromagnetic flowmeter, comprising:

first and second metallic measuring electrodes arranged on opposite sides of the measuring tube and in contact with the medium, a rate of flow of the medium in the measuring tube being measurable by measuring output signals from the first and second measuring electrodes representing a potential difference between the measuring electrodes induced by the flow of the medium in the measuring tube in a presence of a magnetic field; and a current source for passing a constant direct current to each of the first and second metallic measuring electrodes, the constant direct current passed to each of the first and second metallic measuring electrode being established to lower an electrode potential of a respective measuring electrode with respect to the medium to a level below a threshold value to render the respective metallic measuring electrode immune to corrosion with respect to the medium.

2. The electromagnetic flowmeter according to claim 1, further comprising:

means for determining the threshold value based upon a Pourbaix diagram of a material of the respective metallic measuring electrode, such that when the electrode potential of the respective metallic measuring electrode is lowered below the threshold value, the respective metallic measuring electrode achieves a state of immunity to corrosion independent of a pH of the medium.

3. The electromagnetic flowmeter according to claim 1, further comprising:

a flow measurement device configured to measure of flow of said medium based upon output signals from the first and second measuring electrodes;

wherein the current source has an output impedance that does not significantly lower the input impedance of the flow measurement device.

4. A method for corrosion protection of an electromagnetic flowmeter for measuring flow of a medium through a measuring tube, the method comprising:

generating, by a current source, a respective constant direct current for each of first and second metallic measuring electrodes provided on opposite sides of the measuring tube and in contact with the medium: and passing the constant direct current from the current source to the first and second metallic measuring electrodes, the constant direct current passed to each metallic measuring electrode being established to lower an electrode potential of a respective measuring electrode with respect to the medium below a threshold value to render the respective metallic measuring electrode immune to corrosion with respect to the medium.

5. The method according to claim 4, further comprising:

determining the threshold value based on a Pourbaix diagram of a material of the respective metallic measuring electrode, such that when the electrode potential of the respective metallic measuring electrode is lowered below the threshold value, the respective metallic measuring electrode achieves a state of immunity to corrosion independent of a pH of the medium.

6. The method according to claim 5, wherein the current source has an output impedance that does not significantly lower the input impedance of flow measurement based on output signals of the measuring electrodes.

7. The method according to claim 4, wherein the current source has an output impedance that does not significantly lower the input impedance of flow measurement based on output signals of the measuring electrodes.

* * * * *